United States Patent

Kadono et al.

[11] Patent Number: 5,097,576
[45] Date of Patent: Mar. 24, 1992

[54] TRAVELING STEEL PIPE CUTTING MACHINE OF MILLING TYPE

[75] Inventors: Yuzuru Kadono; Masatoshi Okano, both of Mihara, Japan

[73] Assignee: Mitsubishi Jukogyo Kabushiki Kaisha, Tokyo, Japan

[21] Appl. No.: 644,976

[22] Filed: Jan. 23, 1991

[30] Foreign Application Priority Data

Jan. 23, 1990 [JP] Japan ................... 2-11830

[51] Int. Cl.$^5$ .................. B23P 15/28; B26D 1/60; B23C 3/02
[52] U.S. Cl. ..................... 29/33 T; 83/303; 83/318; 409/197
[58] Field of Search ............ 409/197, 159; 29/33 T, 29/33 D; 83/343, 344, 298, 300, 306, 316, 317, 318, 303, 310; 82/53.1

[56] References Cited

U.S. PATENT DOCUMENTS

| | | | |
|---|---|---|---|
| 2,452,343 | 10/1948 | Wilson | 83/306 |
| 3,808,928 | 5/1974 | Plegat | 83/289 |
| 3,815,455 | 6/1974 | Carrell et al. | 82/53.1 |
| 4,022,092 | 5/1977 | Scheib et al. | 83/306 |
| 4,370,140 | 1/1983 | Fegley | 83/318 X |
| 4,488,467 | 12/1984 | Hegler et al. | 83/303 |
| 4,987,808 | 1/1991 | Sicka et al. | 83/318 X |

FOREIGN PATENT DOCUMENTS 199711  8/1989  Japan ................... 409/197

*Primary Examiner*—William Briggs
*Attorney, Agent, or Firm*—Wenderoth, Lind & Ponack

[57] ABSTRACT

The known traveling steel pipe cutting machine of a milling type, which cuts a pipe while traveling in synchronism with a pipe manufacturing speed, is improved so as to facilitate the calculation of positional loci and the control of a milling cutter, to increase a rigidity of the machine and a life of the cutter, and to also make it possible to cut even a pipe having an asymmetric cross-sectional shape under the same set of operating conditions. A plurality of cutter heads each include a milling cutter, and are each supported and linearly fed in biaxial directions by respective guides and feed drive motors. A clamping device is positioned in the proximity of the milling cutters for holding and fixing the pipe. The cutter heads and the clamping device are disposed on a traveling truck. The machine is also provided with a control device for rotationally controlling the feed drive motors for moving the cutter heads on the basis of input data representative of cutting conditions such as a shape and dimensions of the pipe.

2 Claims, 5 Drawing Sheets

TRAVELING STEEL PIPE CUTTING MACHINE OF MILLING TYPE

BACKGROUND OF THE INVENTION

1. Field of the Invention

The present invention relates to a traveling steel pipe cutting machine of a milling type, which cuts a pipe with rotating milling cutters.

2. Description of the Prior Art

A machine for cutting steel pipes was proposed in Japanese Patent Publication No. 62-27926 (1987) entitled "Steel Pipe Cutting Machine Provided With Revolving Type Milling Cutter", and a method therefor was proposed in Japanese Patent Publication No. 62-74525 (1986) entitled "Control Method For Cutting Of Pipes".

In the prior art, as shown in FIGS. 7 and 8, a plurality of cutter heads 2 each equipped with a milling cutter 1 rotating in the up-cut direction are supported by a revolving ring via rotary shafts 3.

This revolving ring (ring gear 10) is revolved about a center axis of a pipe 4 to be cut by the intermediary of a motor 5, gears 6 and 7, a worm gear 8, and a worm wheel 9.

Each cutter head 2 is able to swing as indicated by arcs $\Theta_1$ and $\Theta_2$ for the purpose of keeping a constant depth of cut. A truck on which the cutting machine is loaded can be synchronized with a line speed of the pipe 4. When the truck has been accelerated up to the synchronized speed, the pipe 4 to be cut is clamped by a clamping device (not shown) and the pipe 4 is cut simultaneously by the plurality of milling cutters 1 undergoing the above-mentioned revolution and swinging motions.

As a method of controlling the cutting, an outer diameter of the pipe 4 to be cut, a pipe wall thickness and a maximum depth of cut are preliminarily input to a computer. And, by jointly controlling the rotational position and speed and the swinging position and speed of the milling cutter 1, cutting is effected while maintaining a maximum depth of cut and a constant projection of the milling cutter 1 from the pipe wall thickness.

The prior art for cutting a steel pipe relies on effecting a revolution and swinging motions of the milling cutters. Hence, loci of the milling cutters are calculated as represented by polar coordinates. Therefore, even in the case of a square pipe having a simple configuration, the calculation and control of the desired position loci are complicated procedures.

Moreover, since the cutting machine in the prior art employs a structure in which a reaction force of the milling cutter 1 is received only by the rotary shafts 3, it has poor rigidity, and an inertial mass can be hardly chosen large. Also, as the cutting is conducted intermittently, vibrations of the cutter head 2 become large, a chip thickness cannot be made large, and the life of each cutter edge is short.

Still further, due to the fact that a plurality of cutter heads 2 are revolved in synchronism by means of a revolving ring (ring gear 10), it is impossible to cut a pipe having an asymmetric cross-sectional shape under the same operating conditions.

SUMMARY OF THE INVENTION

It is therefore one object of the present invention to provide an improved traveling steel pipe cutting machine of a milling type which is free from the above-mentioned shortcomings in the prior art.

A more specific object of the present invention is to provide a traveling steel pipe cutting machine of a milling type, in which the calculation and control of positional loci for a milling cutter is simple and easy to carry out, a rigidity of the machine and a life of the cutter are increased, and in which it is possible to cut even a pipe having an asymmetric cross-sectional shape under a single set of operating conditions.

According to one feature of the present invention, there is provided a traveling steel pipe cutting machine of a milling type for cutting a pipe in synchronism with a pipe manufacturing speed, comprising: a plurality of cutter heads each including a milling cutter linearly moving in biaxial directions, guide means and feed means for each cutting head, a clamping device located in the proximity of the milling cutters for holding and fixing the pipe, a traveling truck on which the milling cutters and clamping device are disposed, and a control device for rotationally controlling a feed drive motor for the cutter heads on the basis of input data representative of cutting conditions such as a shape and dimensions of the pipe and the like.

In the operation of the above-featured traveling steel pipe cutting machine of a milling type, when the traveling truck is accelerated and has attained the same speed as that under which the pipe is being manufactured, the pipe to be cut is fixed by the clamping device, and a plurality of cutter heads each of which is movable in biaxial (X-axis and Y-axis) directions are moved independently of one another. Therefore, even a pipe having an asymmetric cross-sectional shape can be cut by the machine. In addition, since a locus of each cutter is represented by orthogonal coordinates rather than by polar coordinates, the calculation of the positional loci and the preparation of a control program for the cutters is simple and easy.

The above-mentioned and other objects, features and advantages of the present invention will become more apparent by referring to the following description of one preferred embodiment of the invention taken in conjunction with the accompanying drawings.

DETAILED DESCRIPTION

Now one preferred embodiment of the present invention will be described with reference to the accompanying drawings.

Figure 1:
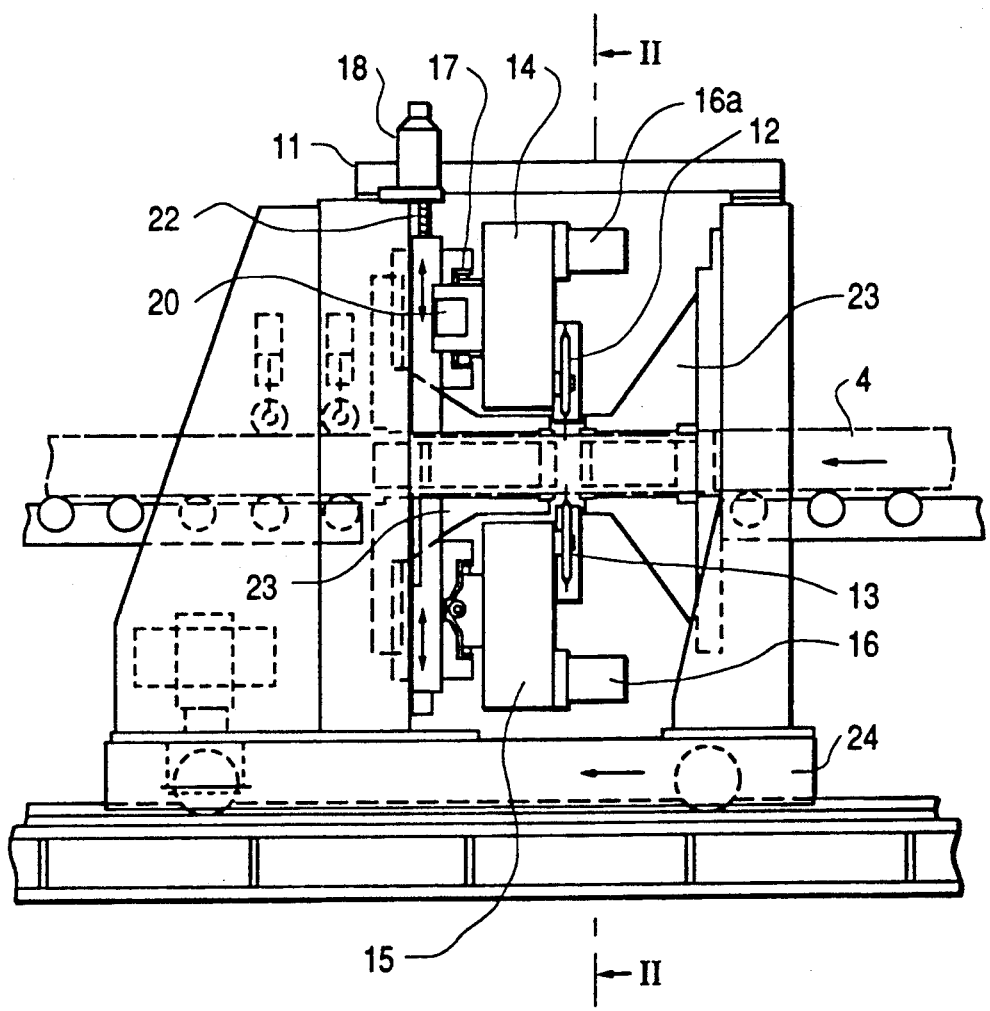
FIG. 1 is a side view of one preferred embodiment of the present invention.
Figure 2:
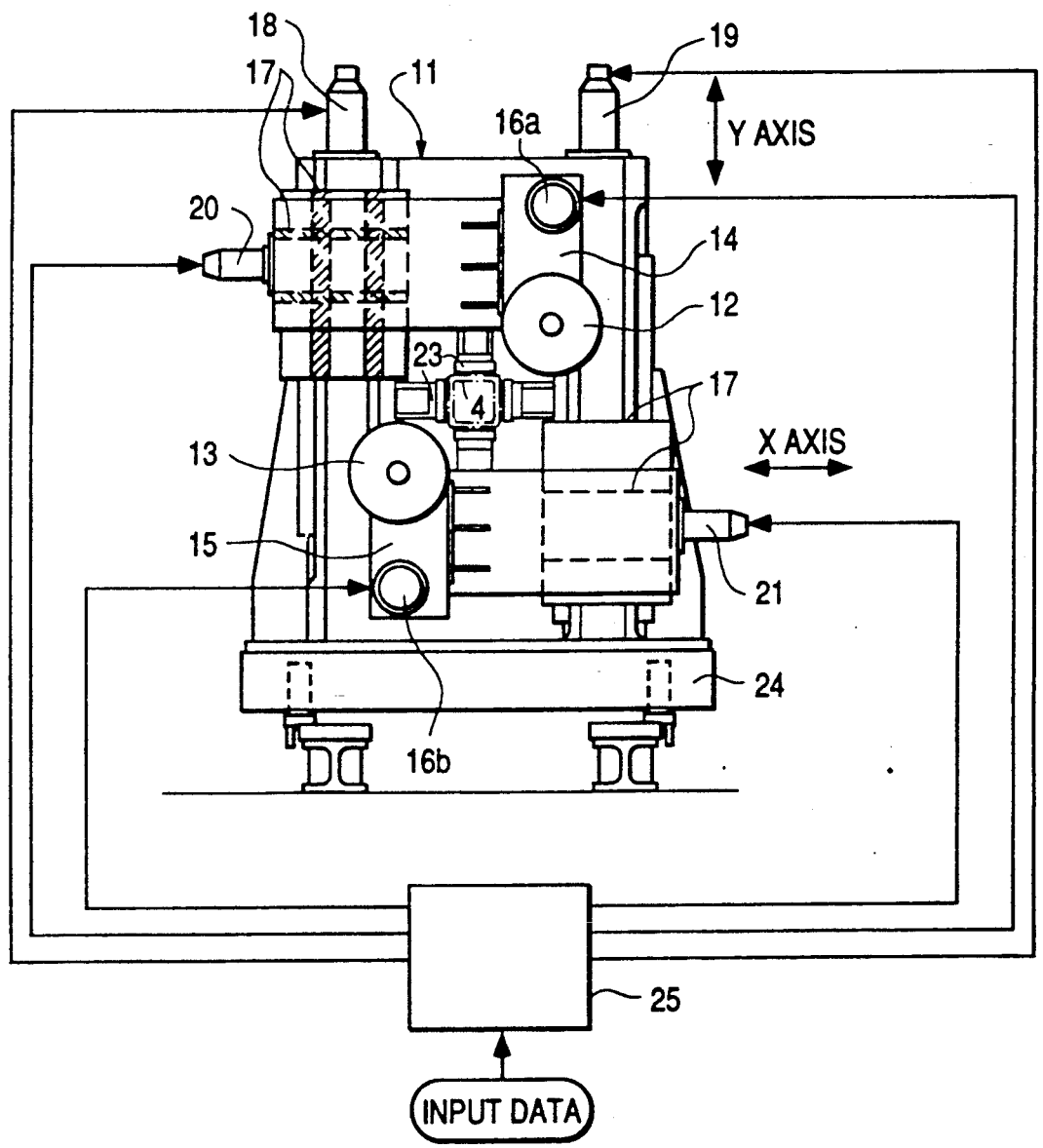
FIG. 2 is a cross-sectional view taken along line II—II in FIG. 1.

As shown in FIGS. 1 and 2, in a traveling pipe cutting machine of a milling type according to the present invention, a first cutter head 14 provided with a first milling cutter 12 rotating in a down-cut direction and a first cutter drive motor 16a and containing drive gears and the like therein, and a second cutter head 15 likewise provided with a second milling cutter 13 and a second cutter drive motor 16b and containing drive gears and the like therein, are held by a sliding device 17 which is movable in two orthogonal directions and which serves as guide means provided within a machine frame 11.

The first cutter head 14 and the first milling cutter 12 are independently driven in the direction of a first axis (hereinafter called the "Y-axis") via feed means such as a feed screw 22 or the like rotated by a first drive motor 18, and independently in the direction of a second axis (hereinafter called the "X-axis") that is orthogonal to the Y-axis by a second drive motor 20. The second cutter head 15 and the second milling cutter 13 are also independently driven in the Y-axis by a third drive motor 19, and are independently driven in the X-axis by a fourth drive motor 21 (see FIG. 2).

In addition, in the proximity of the first and second milling cutters 12 and 13 are provided a pair of front and rear clamping device 23 for clamping a pipe 4 at positions before and behind the cutters, in order to suppress a chattering of the pipe 4 during cutting and to achieve stable cutting.

It is to be noted that the above-described constituent elements are installed on a traveling truck 24 which travels in synchronism with the pipe to be cut.

As shown in FIG. 2, the cutting machine according to the present invention is provided with a control device 25 which has a function of determining cutter peripheral speed, cutter loci, and cutter feed speeds from input cutting condition data such as the shape, dimensions and length of the pipe to be cut. The control device 25 controls the first and second cutter drive motors 16a and 16b and the first to fourth drive motors 18-21.

Figure 3:
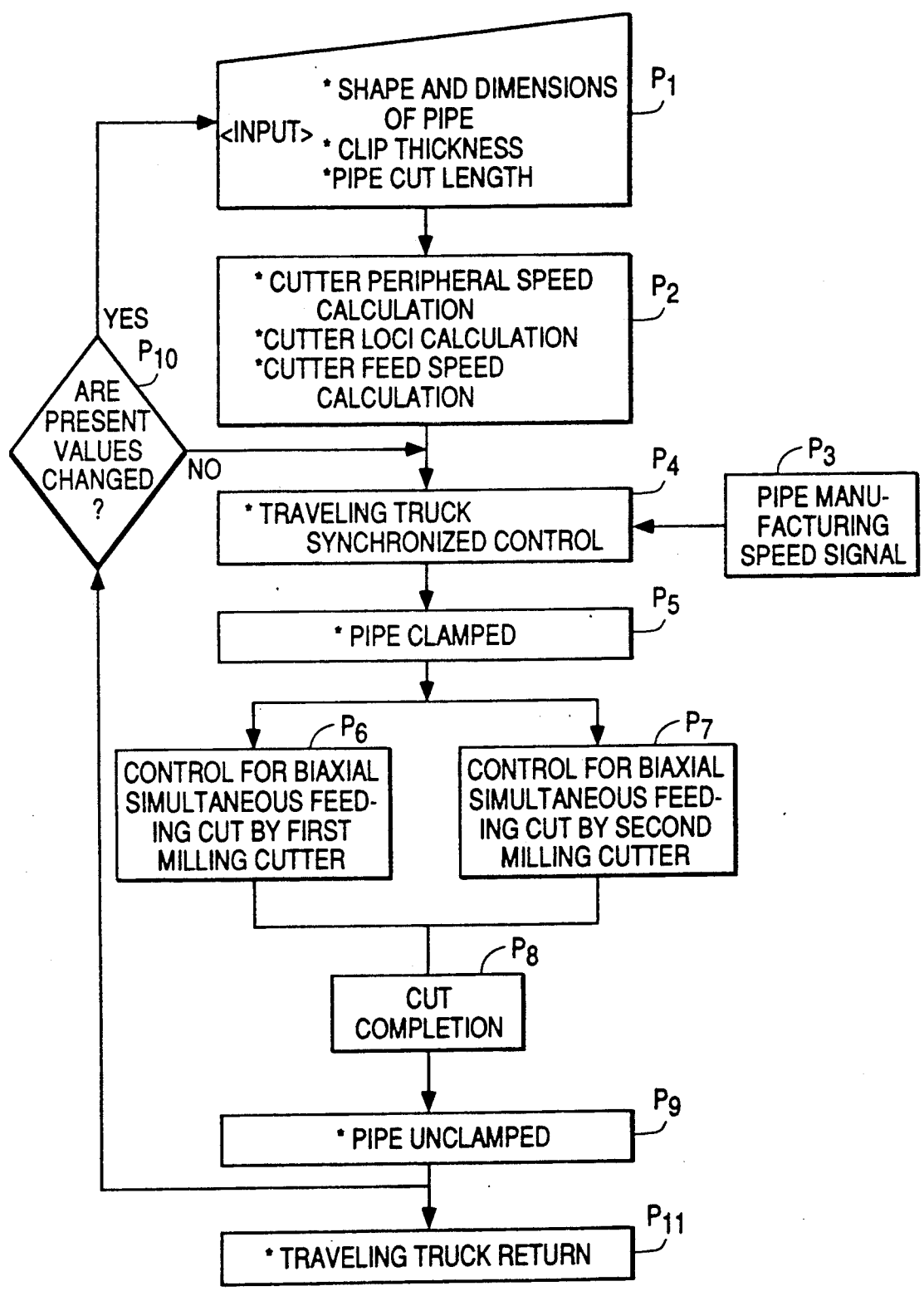
FIG. 3 is a control flow chart of the steps performed by a control device according to one preferred embodiment of the present invention.

Next, the operation of the illustrated cutting machine will be explained on the basis of the flow chart shown in FIG. 3.

At first, when cutting conditions such as a shape and dimensions of a pipe, a cut pipe length, a chip thickness and the like have been input to the control device 25 (see step $P_1$), the control device 25 calculates loci of the respective cutters, feed speeds at the respective positions of the respective cutters, cutter peripheral speeds and the like, and prepares the machine for cutting (see step $P_2$).

Figure 4:
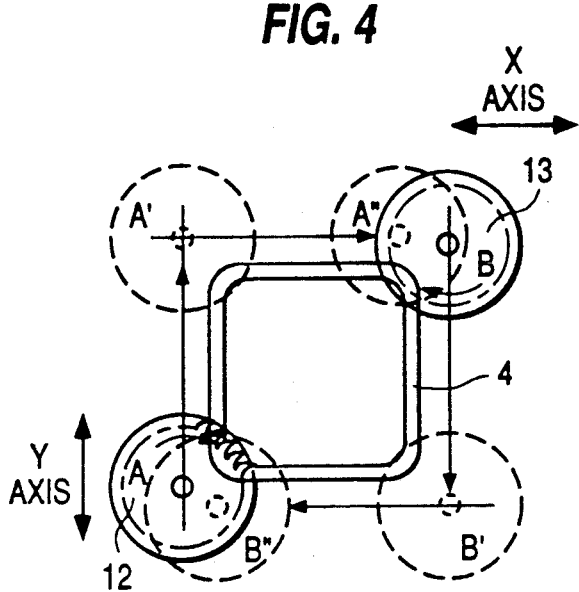
FIG. 4 is a schematic view showing a mode of cutting a pipe according to one preferred embodiment of the present invention.

Subsequently, when the pipe travels, the traveling truck 24 is synchronously controlled (see step $P_4$) by a pipe-manufacturing speed signal (see step $P_3$) so that the pipe may be cut to a set length. And when the pipe and the traveling truck 24 have attained equal speeds, the pipe 4 is clamped by the clamp device 23 (see step $P_5$) proximate the point at which the pipe is to be cut. Afterwards, as shown in FIG. 4, the first and second milling cutters 12 and 13 controllably driven to generate cutter peripheral speeds in the down-cut direction are simultaneously and individually fed biaxially (X-axis and the Y-axis; see step $P_6$ and $P_7$) along the contour of the pipe 4 to be cut. The first milling cutter 12 cuts while moving through the path A→A'→A", and the second milling cutter 13 cuts while moving through the path B→B'→B" as indicated by arrows in FIG. 4.

After the completion of cutting, the clamping device 23 unclamps the pipe 4, and the traveling truck 24 returns to prepare for the next cutting operation (see steps $P_8$, $P_9$ and $P_{11}$). Thereafter, in the case where the preset values are changed in step $P_{10}$, the operation starts from step $P_1$, but in the case where the values are not changed, steps $P_1$ and $P_2$ are omitted.

Figure 5:
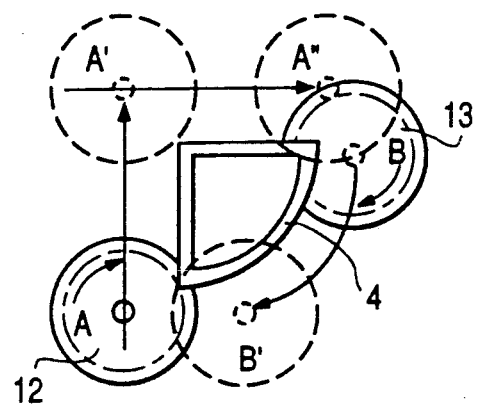
FIG. 5 is a schematic view showing a mode of cutting a pipe having an asymmetric cross-sectional shape according to one preferred embodiment of the present invention.

As shown in FIG. 5, even in the case of a pipe having an asymmetric cross-sectional shape, the first milling cutter 12 is individually moved in the biaxial directions through A→A'→A", and the second milling cutter 13 is individually moved in the biaxial directions through B→B'.

As will be apparent from the detailed description of one preferred embodiment according to the present invention, since cutter loci are represented by orthogonal coordinates, the calculation of positional loci when cutting a pipe having an irregular cross-sectional shape and the preparation of a control program for cutting the pipe can be done in a short period of time, and correcting work in the field also becomes possible.

In addition, since a plurality of cutter heads move individually, even a pipe having an asymmetric cross-sectional shape can be cut.

Furthermore, owing to the fact that a rigidity of guide means is enhanced to increase the force supporting the cutter head, an inertial mass of the cutter head can be made large, the vibration and swinging of the cutter head caused by intermittent cutting which is a characteristic of milling can be reduced. And, jointly with the fact that chattering of the pipe to be cut is suppressed by clamping the pipe in the proximity of the cutting point by means of the clamping device, the cutter edges hardly ever break and the wearing thereof is reduced. In the prior art, a thickness S of the chips produced by cutting was limited to 0.2 mm; but according to the present invention, even if a chip thickness S is chosen to be 0.3 mm or more, the cutter edge will not break during cutting. Therefore, the time required to cut a pipe is greatly shortened, and the required traveling distance of the traveling truck is comparatively small. Thus, not only can both the size of an installation and manufacturing costs be reduced, but also a cutting capability is largely improved, and even a pipe traveling at a high speed can be cut into pipe sections having a short length.

Figure 6:
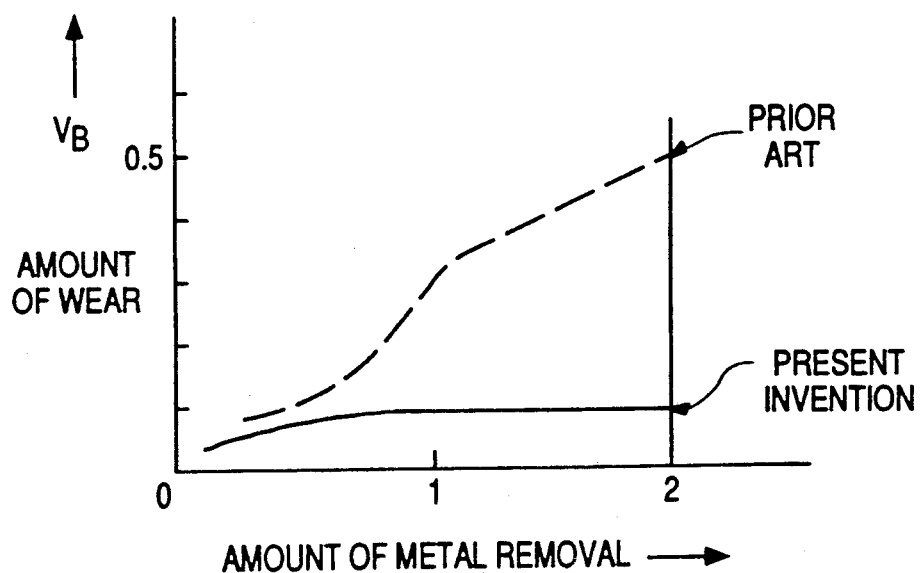
FIG. 6 is a diagram showing comparative data of amounts of chafing of cutter blades under tests obtained by cutting according to the present invention and according to the prior art.
Figure 7:
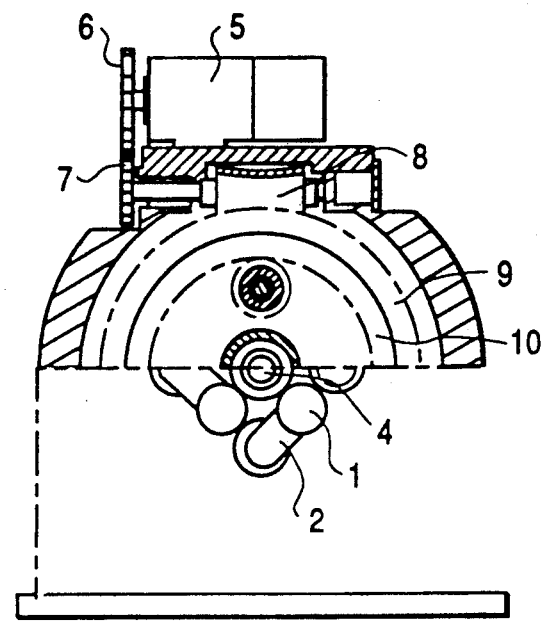
FIG. 7 is a side view, partly cut away, of an essential part of a traveling pipe cutting machine in the prior art.
Figure 8:
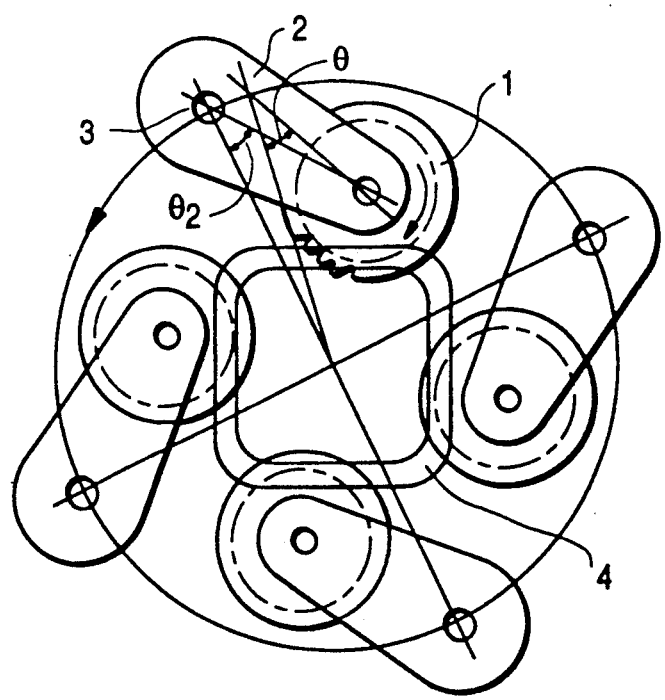
FIG. 8 is a schematic view showing a mode of cutting a pipe according to the known method in the prior art.

In addition, cutting was effected in the prior art using an up-cut method which scarcely gave rise to vibrations to prevent the breaking of a cutter edge. According to tests performed with the present invention, however, cutting can be effected using a down-cut method. FIG. 6 shows comparative data of a flank wear ($V_B$ wear) of a cutter in the prior art and in the present invention when a square pipe was cut by milling at a cutter peripheral speed of 240 m/min. As will be apparent from this figure, after milling away a standard amount of metal, the present invention showed a flank wear in the cutter of one-fifth of that in the case of the prior art. Accordingly, a life of a cutter edge is greatly extended, and the frequency in which the cutters must be exchanged is largely reduced compared to the prior art. Thus, production efficiency can be enhanced, and the expenses associated with the cutters can be greatly reduced.

While a principle of the present invention has been described above in connection with one preferred embodiment of the present invention, it is intended that all matter contained in the above description and illustrated in the accompanying drawings be interpreted as illustrative of and not as a limitation on the scope of the invention.

What is claimed is:

1. A traveling steel pipe cutting machine of a milling type for cutting a pipe while traveling in synchronism with the pipe as the pipe is being fed, said machine comprising:

a plurality of cutter heads each having a milling cutter rotatably mounted thereto, and means for rotating said milling cutter;

respective guide means for supporting each of the cutter heads in the machine in a manner in which each of the cutter heads is linearly movable in biaxial directions;

respective feed drive motor means for feeding each of said cutter heads in said biaxial directions;

clamping device means disposed proximate the milling cutters for clamping a pipe to be cut by the milling cutters;

a traveling-type of truck on which said cutter heads, said respective guide means, said respective feed means and said clamping device means are supported; and control means for controlling said respective feed drive motor means, on the basis of input cutting condition data that is representative of at least the shape or dimensions of the pipe to be cut, to move said cutter heads in a manner in which the milling cutters thereof can be utilized simultaneously to cut different portions of the pipe.

2. A traveling steel pipe cutting machine as claimed in claim 1, wherein said control means is also for controlling said means for rotating the milling cutter of each of said cutter head so as to regulate the peripheral speed of each said milling cutter.

* * * * *